United States Patent
Hansson et al.

(10) Patent No.: US 8,831,686 B2
(45) Date of Patent: Sep. 9, 2014

(54) ADJUSTED NOISE SUPPRESSION AND VOICE ACTIVITY DETECTION

(75) Inventors: Per Magnus Fredrik Hansson, Waterloo (CA); Philippe Gilbert Jacques Joseph Moquin, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/360,879

(22) Filed: Jan. 30, 2012

(65) Prior Publication Data
US 2013/0196715 A1 Aug. 1, 2013

(51) Int. Cl.
*H04B 1/00* (2006.01)
*H04M 1/38* (2006.01)

(52) U.S. Cl.
USPC ........................................... 455/563

(58) Field of Classification Search
USPC .................................... 455/570, 563
See application file for complete search history.

(56) References Cited

U.S. PATENT DOCUMENTS

| | | | |
|---|---|---|---|
| 2004/0142672 A1* | 7/2004 | Stankewitz | 455/296 |
| 2005/0187763 A1* | 8/2005 | Arun | 704/226 |
| 2006/0270421 A1* | 11/2006 | Phillips et al. | 455/457 |
| 2007/0088544 A1 | 4/2007 | Acero et al. | |
| 2007/0230712 A1 | 10/2007 | Belt et al. | |
| 2009/0103744 A1 | 4/2009 | Klinghult | |
| 2009/0209290 A1* | 8/2009 | Chen et al. | 455/563 |
| 2010/0022269 A1 | 1/2010 | Terlizzi | |
| 2010/0056227 A1* | 3/2010 | Hayakawa et al. | 455/570 |
| 2010/0131749 A1 | 5/2010 | Kim et al. | |
| 2011/0010172 A1 | 1/2011 | Konchitsky | |
| 2012/0058803 A1* | 3/2012 | Nicholson | 455/570 |
| 2012/0197635 A1* | 8/2012 | Nystrom | 704/201 |
| 2012/0284022 A1* | 11/2012 | Konchitsky | 704/231 |

FOREIGN PATENT DOCUMENTS

WO 2005/029468 3/2005

OTHER PUBLICATIONS

JS Steelman 97170 EngineEAR® Elite,Noise and Vibration Detection—Retrieved Apr. 5, 2011.
Advanced Noise Reduction for Mobile Telephony—Aug. 2008. http://www.isuppli.com/MEMS-and-Sensors/MarketWatch/Pages/Consumer-and-Cell-Phone-MEMS-to-Generate-$2-Billion-in-2011.aspx—Jan. 31, 2011.
http://store.androidcentral.com/jawbone-prime-bluetooth-headset/11A31A5444.htm—Retrieved Apr. 5, 2011.
JS Steelman 97170 EngineEAR® Elite, Noise and Vibration Detection—Retrieved Apr. 5, 2011.
Watts, Lloyd. "Advanced Noise Reduction for Mobile Telephony", Aug. 2008, p. 90-92.
http://www.isuppl.com/MEMS-and-Sensors/MarketWatch/Pages/Consumer-and-Cell-Phone-MEMS-to-Generate-$2-Billin-in-2011.aspx—Jan. 31, 2011.

(Continued)

*Primary Examiner* — Kwasi Karikari
(74) *Attorney, Agent, or Firm* — Ridout & Maybee LLP (57) ABSTRACT

Dual microphones can be used to improve noise suppression by better distinguishing between speech and background noise. If the user does not hold the handset according to a prescribed orientation, however, the dual microphone noise suppression can actually do a worse job than a single microphone noise suppression algorithm because of mistakes made distinguishing between speech and noise. Here it is proposed to use an accelerometer to determine the orientation of the phone and use this orientation information in the noise suppression algorithm. Also when a person speaks, the vibrations when the device is held against the head can be used to detect speech.

22 Claims, 6 Drawing Sheets

(56) References Cited

OTHER PUBLICATIONS www.prismlab.org/journal_papers/2003bsilva_chau.pdf—Oct. 16, 2003.

http://store.andriodcentral.com/jawbone-prime-bluetooth-headset/11A31A5444.htm—Retrieved Apr. 5, 2011.

* cited by examiner

ADJUSTED NOISE SUPPRESSION AND VOICE ACTIVITY DETECTION

FIELD

The present application relates generally to adjusting noise suppression and, more specifically, to improving noise suppression and voice activity detection.

BACKGROUND

Mobile telephone designers and manufacturers are continually striving to improve their devices and gain a competitive advantage. One area of concentration relates to noise suppression for an audio input aspect of operation of a mobile communication device.

If a noise suppression method can appropriately identify a first portion of a received audio signal that is voice and a second portion of the received audio signal that is background noise, the noise suppression method may be able to process the audio signal to enhance the first portion and degrade the second portion.

BRIEF DESCRIPTION OF THE DRAWINGS

Reference will now be made, by way of example, to the accompanying drawings which show example implementations; and in which.

DETAILED DESCRIPTION

Current, state-of-the-art noise suppression methods have limitations related to accuracy of voice detection. When the accuracy of the voice detection is low, it is accepted that the noise suppression should be conservative, to avoid suppressing the voice along with the noise. Advances in noise suppression algorithms for devices that have two microphones have been able to improve the separation of voice and noise based on one of the two microphones being closer to the mouth.

Operation of a noise suppression algorithm may be augmented using additional information from sensors in the mobile communication device. Input from the sensors allow the noise suppression algorithm to self-adjust so as to reduce degradation of the voice that may occur due to the normal operation of the noise suppression algorithm while the mobile communication device is not held in a preferred position. One particular sensor, an accelerometer, may already be present in the mobile communication device. Such an accelerometer is typically operable to detect orientation and motion. In particular, the accelerometer can provide two types of information useful to a noise suppression algorithm: orientation; and voice detection.

According to an aspect of the present disclosure, there is provided a method of adjusting a noise suppression algorithm in a mobile communication device. The method includes receiving input from an accelerometer and processing the input from the accelerometer. The method further includes adjusting, based on the input, a noise suppression algorithm, thereby producing an adjusted noise suppression algorithm, receiving audio signals, performing the adjusted noise suppression algorithm on the audio signals, thereby producing noise suppressed audio signals and transmitting the noise suppressed audio signals. In other aspects of the present application, a processor is provided for carrying out this method and a computer readable medium is provided for adapting a processor to carry out this method.

According to an aspect of the present disclosure, there is provided a method of adjusting an audio signal processing algorithm in a mobile communication device. The method includes receiving input from a sensor, processing the input from the sensor and adjusting, based on the input, an audio signal processing algorithm, thereby producing an adjusted audio signal processing algorithm. The method further includes receiving audio signals, performing the adjusted audio signal processing algorithm on the audio signals, thereby producing processed audio signals and transmitting the processed audio signals.

Other aspects and features of the present disclosure will become apparent to those of ordinary skill in the art upon review of the following description of specific implementations of the disclosure in conjunction with the accompanying figures.

Figure 1:
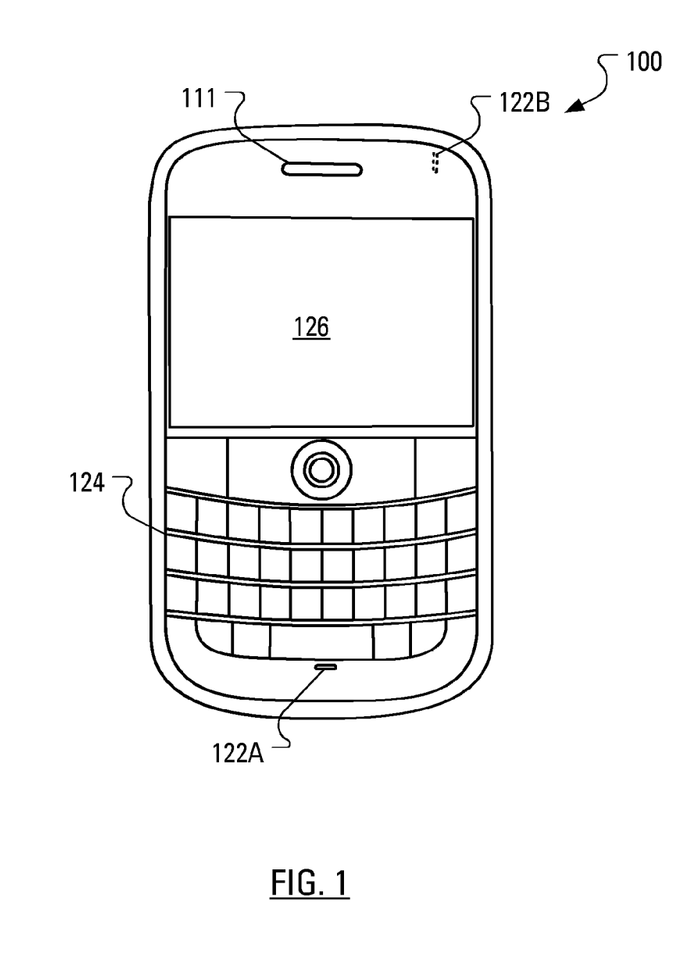
FIG. 1 illustrates a mobile communication device as an example of a device that may implement aspects of the present application.

FIG. 1 illustrates a mobile communication device 100 as an example of a device that may implement aspects of the present application. The mobile communication device 100 includes a housing, an input device (e.g., a keyboard 124 having a plurality of keys) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard displayed on a touchscreen implementation of the display 126. Other types of output devices may alternatively be utilized. Other devices for receiving input may include at least two microphones 112A, 112B (collectively or individually referenced as 112).

As illustrated in FIG. 1, a first microphone 112A may be positioned on a front face of the mobile communication device 100, below the keyboard 124. Additionally, a second microphone 112B may be positioned on a rear face of the mobile communication device 100, near the top of the mobile communication device 100. It should be recognized that the placement of the at least two microphones 112 is dependent upon criteria established by a designer and that the illustrated placement is intended to serve as an example only.

The mobile communication device 100 may, for non-limiting example, be a cellular telephone. Indeed, the range of functionality for a cellular telephone today ranges from basic telephony, in what is known as a "feature phone", to advanced computing ability and connectivity associated with what is known today as a "smart phone". As such, the mobile communication device 100 may be sized and shaped to be held or carried in a human hand. The mobile communication device 100 may, furthermore, have a size and shape now associated with the term "tablet computer".

Figure 2:
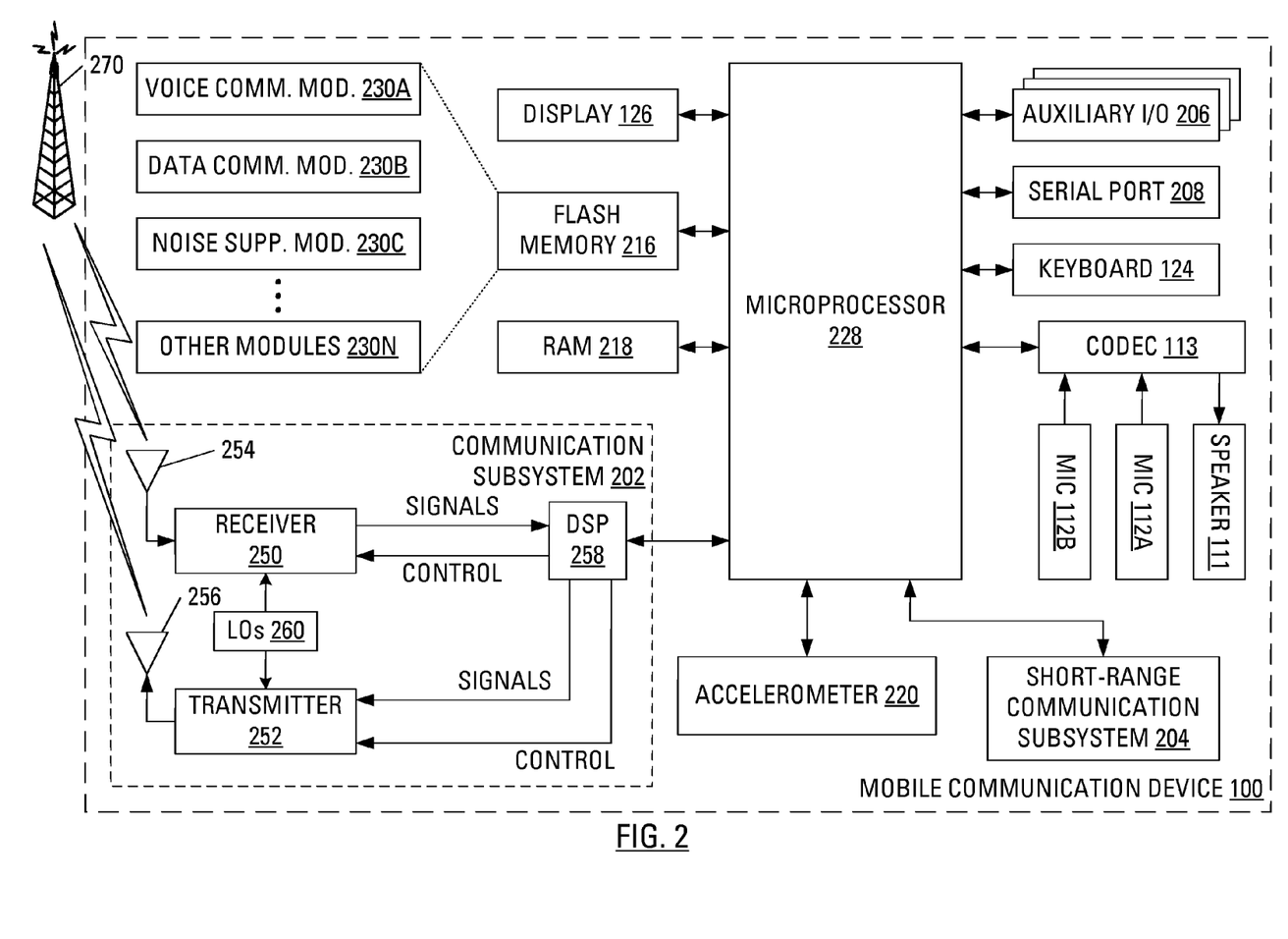
FIG. 2 illustrates components of the mobile communication device of FIG. 1, including an accelerometer.

A processing device (a microprocessor 228) is shown schematically in FIG. 2 as coupled between the keyboard 124 and the display 126. The microprocessor 128 controls the operation of the display 126, as well as the overall operation of the mobile communication device 100, in part, responsive to actuation of the keys on the keyboard 124 by a user.

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the microprocessor 228, other parts of the mobile communication device 100 are shown schematically in FIG. 2. These may include a communications subsystem 202, a short-range communications subsystem 204, the keyboard 124 and the display 126. The mobile communication device 100 may further include other input/output devices, such as a set of auxiliary I/O devices 206, a serial port 208, a speaker 111 and the at least two microphones 112A, 112B.

The speaker 111 and the at least two microphones 112 may be analogue or digital. In the case of analogue components, audio input signals and audio output signals may be transferred between the analogue domain and the digital domain (for use by the microprocessor 228) by a coder/decoder (CODEC) 113.

The mobile communication device 100 may further include memory devices including a flash memory 216 and a Random Access Memory (RAM) 218 and various other device subsystems 220. The mobile communication device 100 may comprise a two-way radio frequency (RF) communication device having voice and data communication capabilities. In addition, the mobile communication device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. A noise suppression module 230C may also be installed on the mobile communication device 100 during manufacture, to implement aspects of the present disclosure. As well, additional software modules, illustrated as an other software module 230N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 100 is intended to operate. For example, the communication subsystem 202 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 126, or alternatively to some auxiliary I/O devices 206. A device user may also compose data items, such as e-mail messages, using the keyboard 124 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 111, and signals for transmission are generated based on signals received at the at least two microphones 112. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication module, etc.

The mobile communication device 100 may also include an accelerometer 220. The accelerometer 220 is an electromechanical device designed to measure acceleration forces and output an indication of the acceleration forces. The acceleration forces may include static forces (e.g., the constant force of gravity) and the acceleration forces may include dynamic forces (e.g., caused by moving or vibrating the accelerometer 220). In general, it may be considered that the output of the accelerometer is generated as a function of orientation of the mobile communication device 100, where the orientation can include position, motion, change in position and change in motion.

Analog accelerometers output a continuous voltage that is proportional to acceleration (e.g., 2.5 V for 0 g, 2.6 V for 0.5 g, 2.7 V for 1 g). Digital accelerometers usually use pulse width modulation for their output. Accordingly, the output of a digital accelerometer is often a square wave of a certain frequency and the amount of time the voltage is high for an individual cycle is proportional to a measured amount of acceleration.

In typical operation, output from the accelerometer 220 may be received and used by the microprocessor 228 to control the display 126 to present information in a landscape orientation or to control the display 126 to present information in a portrait orientation based on the accelerometer 220 providing an indication regarding the manner in which the mobile communication device 100 is being held.

The audio pathway in a single-microphone mobile communication device includes a microphone, a microprocessor and a transmitter. The microphone picks up the voice signal. The microprocessor digitizes voice signal received from the microphone and encodes the digitized voice signal for transmission. The transmitter transmits the signal to the wireless carrier network.

In a noisy environment, noise gets picked up by the microphone. The noise makes the task of encoding the digital voice signal more difficult for the microprocessor. Additionally, noise adds difficulty to the task of determining presence or absence of a voice signal, which difficulty can lead to the mobile communication device wasting energy transmitting noise. Such transmission of noise also adds to wireless carrier network traffic.

A mobile communication device can use two (or more) microphones to capture information about the environment in which the mobile communication device receives various sounds.

A noise suppression algorithm may use a Fast Fourier Transform (FFT) technique, or other techniques, to characterize the frequency spectrum of the various sounds received at the two (or more) microphones. It is often expected, and relied upon, that a frequency spectrum for voice audio is distinct from a frequency spectrum for noise. Once the noise suppression algorithm has characterized the auditory spectra, the noise suppression algorithm may group the frequency components according to the sound source that created the related sounds. In the case of a mobile communication device, it is a goal to group together the frequency components of the voice of the user.

It has been seen in experiments that dual-microphone noise suppression algorithms rely on an assumption that the user holds the mobile communication device as intended by the designers. This assumption is not always valid. When the user holds the phone vertically, for example, rather than along a line between the ear and the mouth, the noise suppression algorithm may reduce the level and quality of the voice signal even more than a mobile communication device with a single-microphone noise suppression algorithm.

In overview, operation of a noise suppression algorithm may be augmented using additional information from sensors in the mobile communication device 100. Input from the sensors allow the noise suppression algorithm to self-adjust so as to reduce degradation of the voice that may occur due to the normal operation of the noise suppression algorithm while the mobile communication device is not held in a preferred position.

As mentioned hereinbefore, the accelerometer 220 is typically operable to detect orientation and motion. In particular, the accelerometer 220 can provide two types of information useful to a noise suppression algorithm: orientation; and voice detection.

Orientation relates to the angle at which is the mobile communication device is being held.

Figure 3:
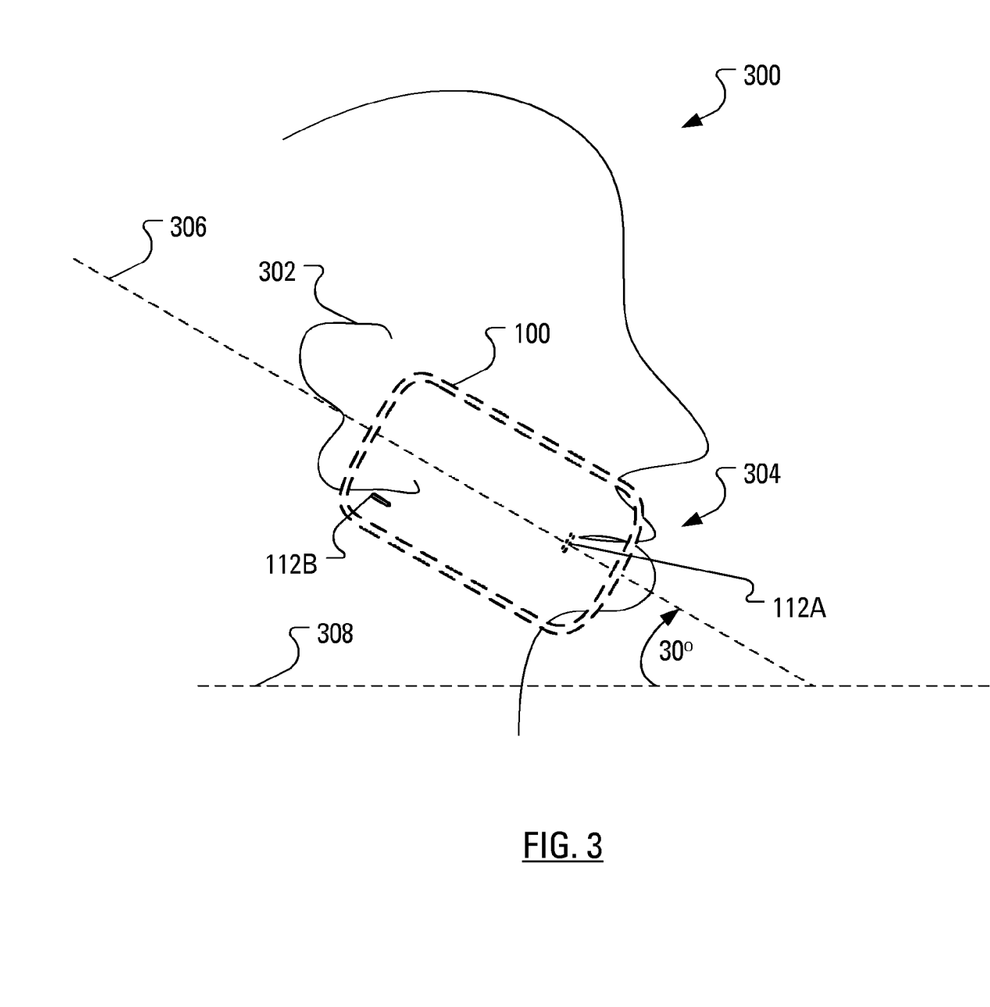
FIG. 3 illustrates the mobile communication device of FIG. 1 and a representation of a head, in profile, having an ear and a mouth.

FIG. 3 illustrates a representation of a head 300, in profile, having an ear 302 and a mouth 304.

In FIG. 3, the mobile communication device 100 may be seen in a first position, perhaps as intended by the designers of a dual-microphone noise suppression algorithm. More specifically, the first microphone 112A is closer to the mouth 304 than the second microphone 112B. The dual-microphone noise suppression algorithm may take into account this expected position of the microphones 112 relative to the mouth 304 when determining which signals to suppress. The orientation of the mobile communication device 100 may be defined by an angle made by the intersection of a longitudinal line 306 through the mobile communication device 100 and a horizontal line 308. In the first position, this orientation angle is 30°.

Figure 4:
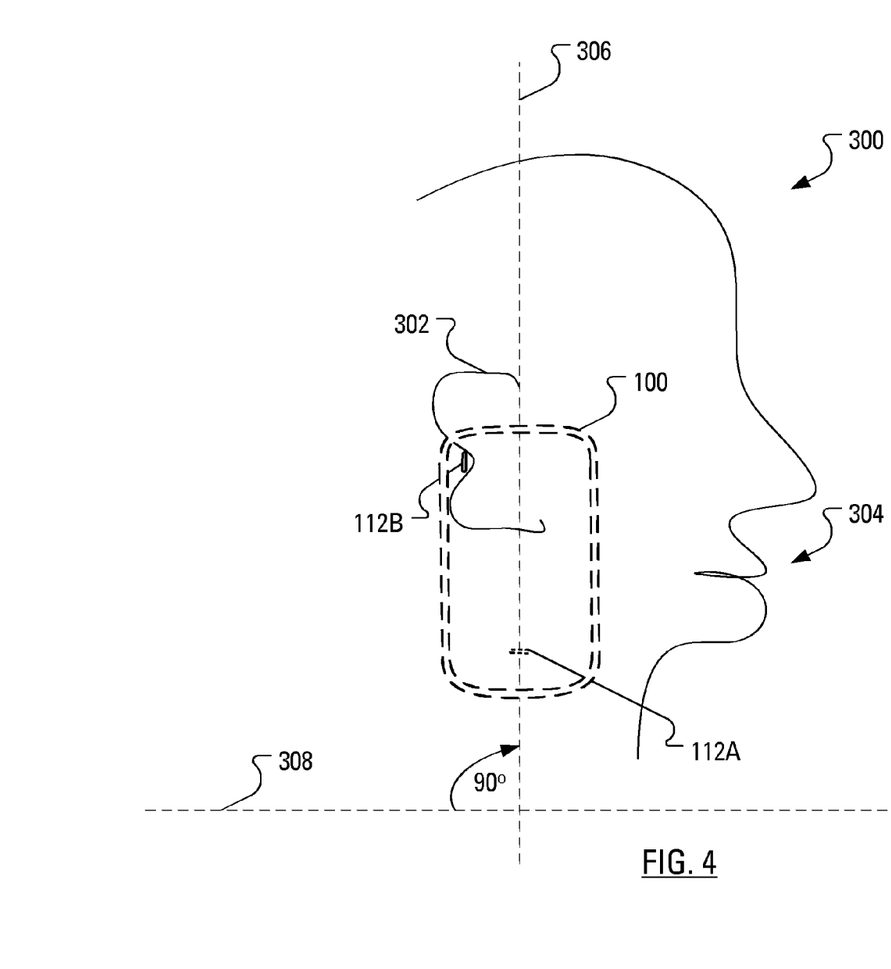
FIG. 4 illustrates the representation of the head from FIG. 3 with the mobile communication device of FIG. 1 at an orientation distinct from the orientation of the mobile communication device in FIG. 3.

FIG. 4 illustrates the representation of the head 300 from FIG. 3.

In FIG. 4, the mobile communication device 100 may be seen in a second position, perhaps distinct from a position intended by the designers of a dual-microphone noise suppression algorithm. More specifically, in the second position, the first microphone 112A and the second microphone 112B are roughly equidistant from the mouth 304. The dual-microphone noise suppression algorithm may not take into account that the microphones 112 are equidistant from the mouth 304 when determining which signals to suppress. In the second position, the orientation angle is 90°.

Figure 5:
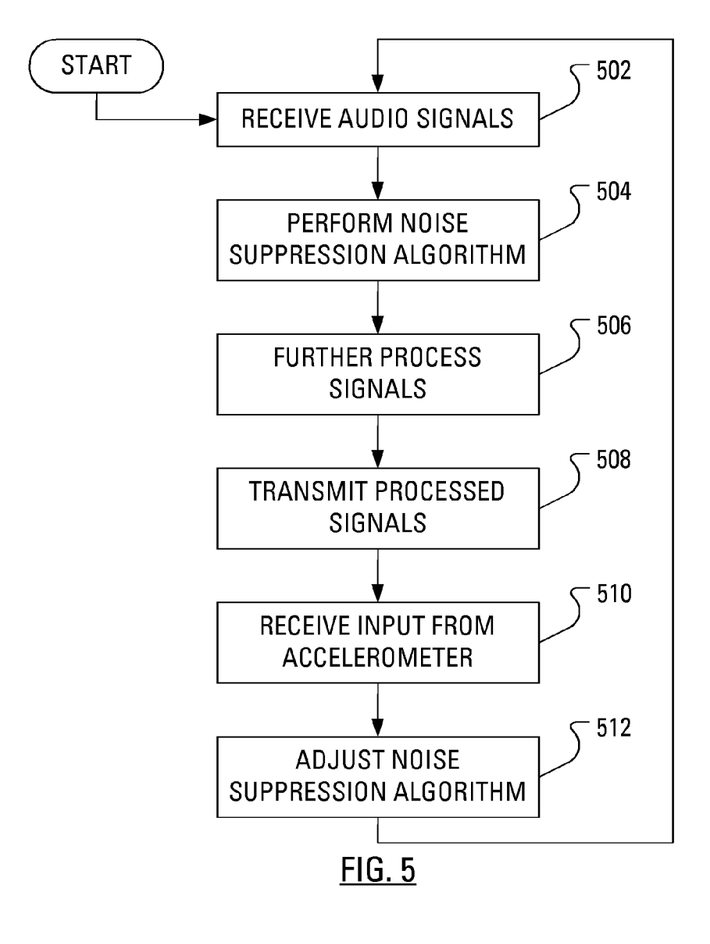
FIG. 5 illustrates example steps in a method of adjusting a noise suppression algorithm based on input from the accelerometer of FIG. 2.

FIG. 5 illustrates example steps in a method of adjusting a noise suppression algorithm based on input from the accelerometer 220. Initially, audio signals are received (step 502) from the two microphones 112A, 112B. These audio signals may include a mix of voice audio and noise audio. The audio signals may be analog or digital electrical signals encoded or generated, by the two microphones 112A, 112B, or the CODEC 113, if present, as a function of sound waves received at the two microphones 112A, 112B.

The microprocessor 228 may perform (step 504) a dual-microphone noise suppression algorithm on the audio signals based on an assumption that the mobile communication device 100 is being held as intended by the designers of the dual-microphone noise suppression algorithm. The microprocessor 228 may also perform (step 506) further processing on the noise suppressed audio signal before passing (step 508) the processed audio signal to the communications subsystem 202.

As proposed in the present application, the microprocessor 228 may receive (step 510) input from the accelerometer 220. The microprocessor 228 may process the input from the accelerometer 220 to extract information. Based on the input received from the accelerometer 220, the microprocessor 228 may adjust (step 512) the dual-microphone noise suppression algorithm.

More particularly, adjusting the dual-microphone noise suppression algorithm may involve setting one or more of the parameters of the dual-microphone noise suppression algorithm without regard to what those parameters may have been in the past. Additionally or alternatively, adjusting the dual-microphone noise suppression algorithm may involve changing an existing parameter (e.g., increasing the value of the existing parameter or decreasing the value of the existing parameter). The parameters may, for example, be weighting factors assigned to distinct signals, or elements of representations of signals, from distinct ones of the two microphones 112A, 112B. The processing of the input from the accelerometer 220 may, for example, involve determining an approximate distance between each microphone 112 and the mouth 304. The weighting factor for a particular microphone 112 may, then, relate to the approximate distance between the particular microphone 112 and the mouth 304.

Adjusting the dual-microphone noise suppression algorithm may include adding or omitting steps or sub-routines of the algorithm. Adjusting the dual-microphone noise suppression algorithm may also include taking into account more or fewer parameters. Taking into account fewer parameters may be accomplished by setting one or more weighting factors to one. In general, adjusting the dual-microphone noise suppression algorithm may include changing the factors that the algorithm uses and may also include changing the steps of the algorithm itself.

Subsequent to the receipt (step 510) of input from the accelerometer 220, the microprocessor 228 may receive (step 502) further audio signals.

The microprocessor 228 may perform (step 504) the adjusted dual-microphone noise suppression algorithm on the further audio signals. The microprocessor 228 may also perform (step 506) further processing on the noise suppressed further audio signal before passing (step 508) the processed further audio signal to the communications subsystem 202.

Orientation information from the accelerometer 220 allows the microprocessor 228 to determine the approximate distance between each of the two microphones 112 and the mouth 304, i.e., thereby proving a clue to an expected level difference between the voice audio received at the two microphones 112A, 112B.

Figure 6:
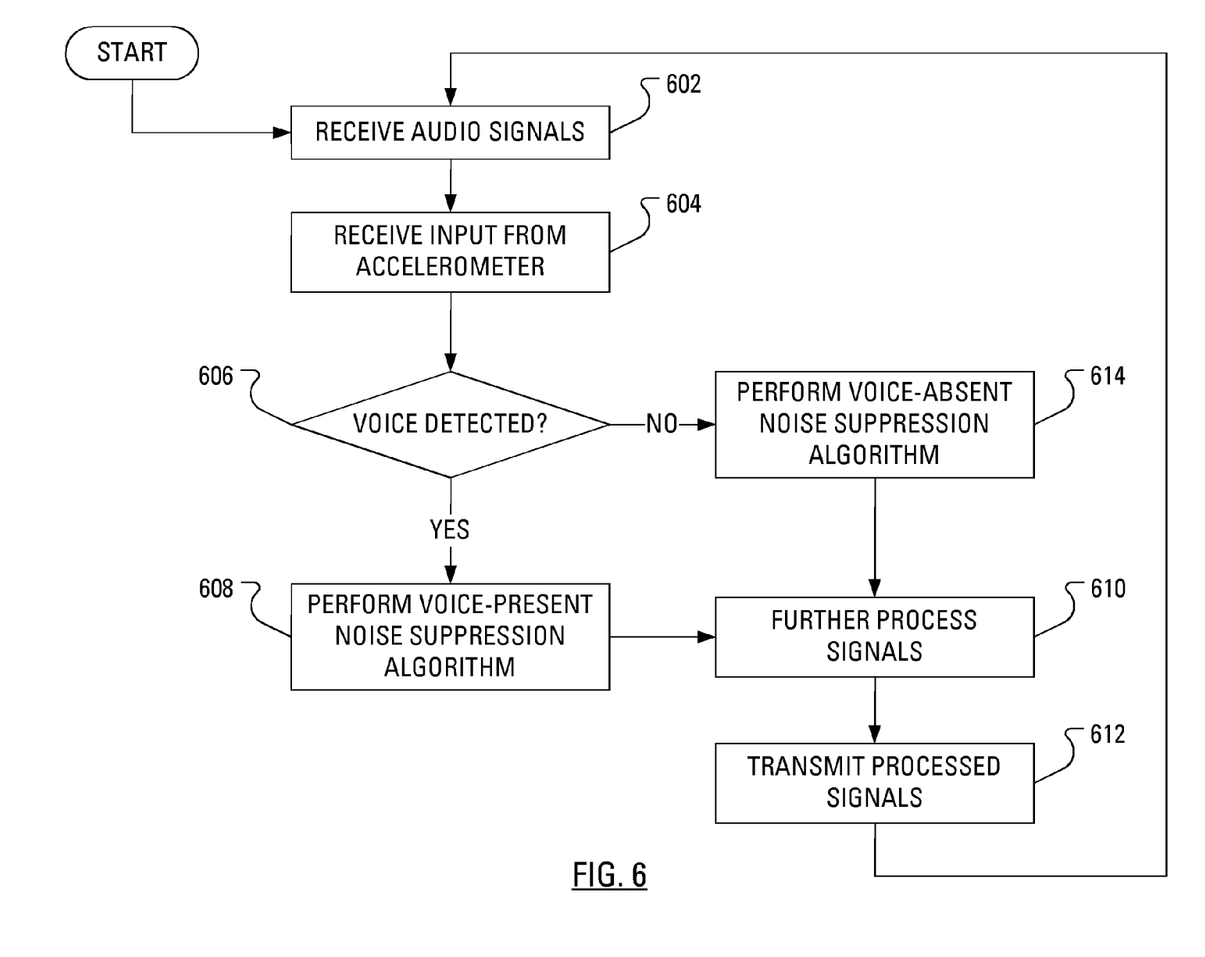
FIG. 6 illustrates a method of voice detection for a noise suppression algorithm based on input from the accelerometer of FIG. 2.

Notably, in some embodiments, as discussed hereinbefore, the microprocessor 228 performs the noise suppression algorithm (step 504 in FIG. 5 and steps 608 and 614 in FIG. 6). However, as will be clear to a person skilled in the art, the noise suppression algorithm (step 504 in FIG. 5 and steps 608 and 614 in FIG. 6) may also be performed by the CODEC 113, if present.

As mentioned hereinbefore, the accelerometer 220 can provide two types of information useful to a noise suppression algorithm: orientation; and voice detection. With orientation discussed, we can turn our attention to voice detection.

Voice detection relates to detecting the presence or absence of voice. In general, to conserve energy, typical mobile communication devices attempt to discern between moments when a user is talking (active speech periods) and moments when the user is listening, and not talking (non-speech periods). For non-speech periods, the mobile communication device can conserve energy by not transmitting audio received at the microphone. Furthermore, by analyzing the audio received at the microphone while the user is not speaking, a noise suppression algorithm may obtain a more accurate representation of the noise in the environment in which the user is operating the mobile communication device. Such a representation may be useful when suppressing noise during active speech periods. Still further, the noise suppression algorithm may apply a first noise suppression technique during a non-speech period and a second noise suppression technique during an active speech period.

It can be shown that when a user speaks and holds the mobile communication device 100 against his ear 302 and head 300, vibrations from the head 300 can be picked up by the accelerometer 220. It is proposed herein to employ vibrations detected by the accelerometer 220 when distinguishing, in the noise suppression algorithm, between non-speech periods and active speech periods.

While attempts to distinguish between non-speech periods and active speech periods are known to exist in noise suppression algorithms, indications of sensed head vibrations provided to the noise suppression algorithm by the accelerometer 220 can improve the accuracy of such distinguishing.

In a noisy environment, it can be shown that the user tends press the mobile communication device 100 against the head 300 to a greater extent. Conveniently, responsive to the mobile communication device 100 being held against the head 300 to a greater extent, the magnitude of the vibrations indicated by the accelerometer 220 can be shown to be increased correspondingly, thereby leading to even further improved voice detection.

FIG. 6 illustrates a method of voice detection for a noise suppression algorithm based on input from the accelerometer 220. Initially, audio signals are received (step 602) from the two microphones 112A, 112B. These audio signals may include a mix of voice audio and noise audio. As proposed in the present application, the microprocessor 228 may receive (step 604) input from the accelerometer 220. Based on the input received from the accelerometer 220, the microprocessor 228 may determine (step 606) whether to expect the presence or absence of voice signals in the mix of received audio. Such determining may, for example, involve processing the input from the accelerometer 220 to determine whether vibrations have been detected and whether those vibrations are likely to be representative of voice vibrations transferred to the mobile communication device 100 being held against the head of the user.

Upon determining, based on the input received from the accelerometer 220, to expect presence of voice in the mix of received audio, the microprocessor 228 may perform (step 608) a voice-present noise suppression algorithm on the audio signals. The microprocessor 228 may then perform (step 610) further processing on the noise suppressed audio signal before passing (step 612) the processed audio signal to the communications subsystem 202.

Upon determining, based on the input received from the accelerometer 220, to expect absence of voice in the mix of received audio, the microprocessor 228 may perform (step 614) a voice-absent noise suppression algorithm on the audio signals. The microprocessor 228 may then perform (step 610) further processing on the noise suppressed audio signal before passing (step 612) the processed audio signal to the communications subsystem 202.

Performance of the voice-absent noise suppression algorithm (step 614) may also include "training" the noise suppression algorithm. That is, when it is determined (step 606) that no voice is present, the noise suppression algorithm may establish a level and a spectrum for the background noise and save a representation of the background noise for use in the voice-present noise suppression algorithm.

The simplest voice-absent noise suppression algorithm is to not transmit any audio received by the microphones 112. However, the person on a the distant end of a telephone call may find such silence disconcerting and "unnatural". As such, the voice-absent noise suppression algorithm may be arranged to reduce the level of transmitted background noise, without completely eliminating the background noise. Indeed, the voice-absent noise suppression algorithm may be arranged to allow transmission of a similar amount of background noise as is allowed to be transmitted by the voice-present noise suppression algorithm. Through use of common filtering techniques, the voice-absent noise suppression algorithm may be arranged to maintain the character of the background noise to be similar to the character of the background noise allowed to be transmitted by the voice-present noise suppression algorithm.

Notably, the embodiment represented by FIG. 6 is equally applicable to single-microphone and multi-microphone noise suppression algorithms.

The location of the accelerometer 220 in the mobile communication device 100 may have a bearing on the accuracy of vibration detection. Using an existing accelerometer 220 in the method of FIG. 6, the vibrations detected by the accelerometer 220 may be subject to a frequency response of the collective components of the mobile communication device 100. If the mobile communication device 100 is designed to carry out the method of FIG. 6, the accelerometer 220 may be coupled to the front face of the mobile communication device 100 to optimally detect head vibrations related to the user speaking.

Conveniently, through a software upgrade to enhance existing noise suppression algorithms, aspects of the present disclosure may be implemented, without need for additional hardware, in existing mobile communication devices by using an existing accelerometer. However, it should be clear that noise suppression algorithms employing aspects of the present disclosure may be even further enhanced through use of an accelerometer with bandwidth larger than the bandwidth of the accelerometers typically found in mobile communication devices.

Instead of, or in addition to, input from the accelerometer 220, input from other sensors may be used when estimating how the user is holding the mobile communication device 100. Furthermore, input from the other sensors may be used when estimating other environmental factors that affect audio performance. The other sensors may include, for but a few examples, magnetometers, altimeters, thermometers and Global Positioning System (GPS) hardware.

In one example, the robustness of the voice detection (step 606) may be enhanced by combining information received (step 604) from the accelerometer 220 with information received (not shown) from a proximity sensor (not shown).

The proximity of interest is the proximity of the mobile communication device 100 to the user's face (e.g., while the mobile communication device 100 is being held at the ear 302). Once it is determined that the device is being held at the ear 302, it can be assumed that the speaker 111 is centered on the ear 302. Using the information received (step 604) from the accelerometer 220, the microprocessor 228 may determine proximity of the mouth 304 (FIGS. 3 and 4) to the microphones 112. Information regarding proximity of the mouth 304 to the microphones 112, in turn, may allow the microprocessor 228 to modify an acoustic echo cancelling algorithm and a noise suppression algorithm.

Many functions of the mobile communication device 100 may be enhanced by combining information received (step 604) from the accelerometer 220 with information received (not shown) from GPS hardware (not shown).

The mobile communication device 100 may determine that it is positioned in a docking station based on detecting, using the accelerometer 220, that an angle made between the mobile communication device 100 and horizontal is constant and based on detecting, using the GPS hardware, that the position of the mobile communication device 100 is static. Furthermore, by detecting the angle made between the mobile communication device 100 and horizontal, the microprocessor 228 may distinguish between models of docking station.

The mobile communication device 100 may determine that it is positioned flat on a surface based on detecting, using the accelerometer 220, a constant zero angle made between the mobile communication device 100 and horizontal and based on detecting, using the GPS hardware, that the position of the mobile communication device 100 is static. Information regarding positioning of the mobile communication device 100 flat on a surface may allow the microprocessor 228 to appropriately modify an acoustic echo cancelling algorithm and a noise suppression algorithm.

The mobile communication device 100 may determine that it is positioned in or on a moving vehicle. The microprocessor 228 may, for example, detect, using the GPS hardware, that the position of the mobile communication device 100 is changing at a rate greater than 10 km/hour. Noise in a moving vehicle may be generally correlated to the speed. Accordingly, the microprocessor 228 may appropriately modify the noise suppression algorithm based on information received from the GPS hardware. Furthermore, the microprocessor 228 may appropriately modify the acoustic echo cancelling algorithm to suit an in-vehicle situation, as distinct from an in-building situation.

The mobile communication device 100 may determine that it is positioned with a walking user. The microprocessor 228 may, for example, detect, using the GPS hardware, that the position of the mobile communication device 100 is changing at a rate less than around 3 km/hour. Through combining information received from a magnetometer and an altimeter, the microprocessor 228 may be provided with further clues that help establish that the user is walking. If information received from the magnetometer stays fairly consistent, then the user is probably in a slow moving vehicle. If information received from the magnetometer is more random, then the user is probably walking. Information from the accelerometer 220 will provide further clues that help establish that the user is walking as the gait of the user should provide a low frequency signal in the axis towards the ground. Finally, information from the altimeter may indicate that the user is ascending or descending. Received sensor information indicative of a fairly consistent gait, altitude and magnetometer reading may be interpreted as representative of a user walking in a building. Less constant received sensor information may be interpreted as representative of a user walking outside. Additionally, received sensor information from a thermometer indicative of an ambient temperature that deviates from a defined room temperature may be interpreted as representative of the mobile communication device 100 being outside. In the case of the mobile communication device 100 being determined to be likely outside, the microprocessor 228 may appropriately modify the noise suppression algorithm to deal with wind noise and other noise associated with an outdoor environment.

Conveniently, aspects of the present application may be found to be adaptable to a variety of mobile communication devices. Additional hardware for implementing aspects of the present application, if any, is readily found in small and lightweight form factors. Notably, size and weight are important considerations when designing improvements for mobile communication devices. Indeed, for some aspects of the present application, no additional hardware is required as existing hardware can be employed. Aspects of the present application illustrate further benefits by working in concert with existing noise-handling systems or techniques.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of adjusting a noise suppression algorithm in a mobile communication device, the method comprising:
receiving input related to vibration of the mobile communication device from an accelerometer, the vibration of the mobile communication device resulting from the mobile communication device being against a head;
processing the input from the accelerometer;
adjusting, based on the input, a noise suppression algorithm, thereby producing an adjusted noise suppression algorithm;
receiving audio signals;
performing the adjusted noise suppression algorithm on the audio signals, thereby producing noise suppressed audio signals, wherein the processing relates to determining a likelihood of a presence of a voice signal in the audio signals; and
transmitting the noise suppressed audio signals.

2. The method of claim 1 wherein the input from the accelerometer is generated, at the accelerometer, as a function of orientation of the mobile communication device.

3. The method of claim 2 wherein the orientation of the mobile communication device comprises a position of the mobile communication device.

4. The method of claim 2 wherein the orientation of the mobile communication device comprises motion of the mobile communication device.

5. The method of claim 2 wherein the orientation of the mobile communication device comprises a change in position of the mobile communication device.

6. The method of claim 2 wherein the orientation of the mobile communication device comprises a change in motion of the mobile communication device.

7. The method of claim 1 wherein the processing comprises determining an approximate distance between a microphone of the mobile communication device and a mouth of a user.

8. The method of claim 7 wherein the adjusting the noise suppression algorithm comprises employing the distance.

9. The method of claim 1 wherein the received audio signals are received by a microphone of the mobile communication device.

10. The method of claim 9 wherein, upon determining likely presence of a voice signal in the audio signal, adjusting the noise suppression algorithm to reflect a presence of a voice signal.

11. The method of claim 9 wherein, upon determining unlikely presence of a voice signal in the audio signal, adjusting the noise suppression algorithm to reflect an absence of a voice signal.

12. The method of claim 1 wherein the processing the input from the accelerometer relates to determining a likelihood of the vibrations being representative of voice vibrations transferred to the mobile communication device being held against the head of the user.

13. The method of claim 1 wherein the input related to vibration of the mobile communication device includes an indication of a magnitude, the method further comprising receiving, from the accelerometer, an indication of an increase in the magnitude of the vibrations and interpreting the increase as indicative of the mobile communication device being held against the head to a greater extent.

14. A mobile communication device comprising:
an accelerometer integral to the mobile communication device;
a communication subsystem;
a processor adapted to:
receive input related to vibration of the mobile communication device from the accelerometer, the vibration of the mobile communication device resulting from the mobile communication device being against a head;
process the input from the accelerometer;
adjust, based on the input, a noise suppression algorithm, thereby producing an adjusted noise suppression algorithm;
receive audio signals;
perform the adjusted noise suppression algorithm on the audio signals, thereby producing noise suppressed audio signals, wherein the processing relates to determining a likelihood of a presence of a voice signal in the audio signals; and
transmit the noise suppressed audio signals to the communication subsystem.

15. The mobile communication device of claim 14 wherein the mobile communication device has a front face and the accelerometer is coupled to the front face.

16. A computer-readable medium containing computer-executable instructions that, when performed by a processor of a mobile communication device, cause the processor to:
receive input related to vibration of the mobile communication device from an accelerometer, the vibration of the mobile communication device resulting from the mobile communication device being against a head;
process the input from the accelerometer;
adjust, based on the input, a noise suppression algorithm, thereby producing an adjusted noise suppression algorithm;
receive audio signals;
perform the adjusted noise suppression algorithm on the audio signals, thereby producing noise suppressed audio signals, wherein the processing relates to determining a likelihood of a presence of a voice signal in the audio signals; and
transmit the noise suppressed audio signals.

17. A method of adjusting an audio signal processing algorithm in a mobile communication device, the method comprising:
receiving input from a sensor;
processing the input from the sensor;
adjusting, based on the input, an echo cancelling algorithm, thereby producing an adjusted echo cancelling algorithm;
receiving audio signals;
performing the adjusted echo cancelling algorithm on the audio signals, thereby producing processed audio signals; and
transmitting the processed audio signals.

18. The method of claim 17 wherein the sensor comprises an accelerometer.

19. The method of claim 17 wherein the sensor comprises global positioning system hardware.

20. The method of claim 17 wherein the sensor comprises a magnetometer.

21. The method of claim 17 wherein the sensor comprises an altimeter.

22. The method of claim 17 wherein the sensor comprises a thermometer.

* * * * *